(12) United States Patent
Keresman, III et al.

(10) Patent No.: US 10,872,343 B2
(45) Date of Patent: *Dec. 22, 2020

(54) SECURE AND EFFICIENT PAYMENT PROCESSING SYSTEM

(71) Applicant: CardinalCommerce Corporation, Mentor, OH (US)

(72) Inventors: Michael A. Keresman, III, Kirtland Hills, OH (US); Chandra S. Balasubramanian, Mentor-on-the-Lake, OH (US); Francis M. Sherwin, Cleveland Heights, OH (US)

(73) Assignee: CardinalCommerce Corporation, Mentor, OH (US)

( * ) Notice: Subject to any disclaimer, the term of this patent is extended or adjusted under 35 U.S.C. 154(b) by 360 days.

This patent is subject to a terminal disclaimer.

(21) Appl. No.: 15/942,780

(22) Filed: Apr. 2, 2018

(65) Prior Publication Data

US 2018/0232736 A1 Aug. 16, 2018

Related U.S. Application Data

(63) Continuation of application No. 14/026,458, filed on Sep. 13, 2013, now abandoned, which is a
(Continued)

(51) Int. Cl.
*G06F 40/00* (2020.01)
*G06Q 20/40* (2012.01)
(Continued)

(52) U.S. Cl.
CPC .......... *G06Q 20/409* (2013.01); *G06Q 20/04* (2013.01); *G06Q 20/10* (2013.01); *G06Q 20/385* (2013.01);
(Continued)

(58) Field of Classification Search
None
See application file for complete search history.

(56) References Cited

U.S. PATENT DOCUMENTS

| 3,806,874 A | 4/1974 | Ehrat |
| 3,906,460 A | 9/1975 | Halpern |

(Continued)

FOREIGN PATENT DOCUMENTS

| CA | 2340621 A1 | 5/1999 |
| EP | 0668579 A2 | 8/1995 |

(Continued)

OTHER PUBLICATIONS

Birch, "Real electronic commerce—smart cards on the superhighway", Internet Research: Electronic Networking Applications and Policy, 1997, pp. 116-119, vol. 7, Issue 2.
(Continued)

*Primary Examiner* — Olabode Akintola
(74) *Attorney, Agent, or Firm* — The Webb Law Firm

(57) ABSTRACT

A method is provided for facilitating session-based authentication for a plurality of e-commerce transactions for an account holder. The method includes registering a plurality of account holders, receiving, from an account holder of the plurality of account holders, user input setting the account privilege information for an account corresponding to the account holder, and receiving a transaction request for an e-commerce transaction between the account holder and a merchant, the transaction request comprising transaction details including a transaction value and a transaction time, and, in response to the transaction request, performing, with at least one computer system, an authentication process. The method further includes processing the e-commerce transaction in response to completing the authentication process, receiving at least one subsequent transaction request for at least one subsequent e-commerce transaction, and determin-
(Continued)

ing to bypass the authentication process for the at least one subsequent transaction.

19 Claims, 7 Drawing Sheets

Related U.S. Application Data continuation of application No. 12/251,853, filed on Oct. 15, 2008, now Pat. No. 9,430,769.

(60) Provisional application No. 60/980,061, filed on Oct. 15, 2007.

(51) Int. Cl.
*G06Q 20/04* (2012.01)
*G06Q 20/10* (2012.01)
*G06Q 20/38* (2012.01)
*G07F 7/08* (2006.01)

(52) U.S. Cl.
CPC ........... *G06Q 20/40* (2013.01); *G06Q 20/405* (2013.01); *G06Q 20/4014* (2013.01); *G06Q 20/4037* (2013.01); *G07F 7/08* (2013.01)

(56) References Cited

U.S. PATENT DOCUMENTS

| | | | |
|---|---|---|---|
| 4,720,860 A | 1/1988 | Weiss | |
| 4,747,050 A | 5/1988 | Brachtl et al. | |
| 4,799,156 A | 1/1989 | Shavit et al. | |
| 4,800,590 A | 1/1989 | Vaughan | |
| 4,885,778 A | 12/1989 | Weiss | |
| 5,005,939 A | 4/1991 | Arvanitakis et al. | |
| 5,168,520 A | 12/1992 | Weiss | |
| 5,231,569 A | 7/1993 | Myatt et al. | |
| 5,233,655 A | 8/1993 | Shapiro | |
| 5,237,614 A | 8/1993 | Weiss | |
| 5,323,465 A | 6/1994 | Avarne | |
| 5,361,062 A | 11/1994 | Weiss et al. | |
| 5,444,444 A | 8/1995 | Ross | |
| 5,479,512 A | 12/1995 | Weiss | |
| 5,479,519 A | 12/1995 | Davis | |
| 5,485,519 A | 1/1996 | Weiss | |
| 5,491,752 A | 2/1996 | Kaufman et al. | |
| 5,557,518 A | 9/1996 | Rosen | |
| 5,590,197 A | 12/1996 | Chen et al. | |
| 5,625,694 A | 4/1997 | Lee et al. | |
| 5,655,023 A | 8/1997 | Cordery et al. | |
| 5,657,388 A | 8/1997 | Weiss | |
| 5,692,132 A | 11/1997 | Hogan | |
| 5,715,314 A | 2/1998 | Payne et al. | |
| 5,742,683 A | 4/1998 | Lee et al. | |
| 5,742,684 A | 4/1998 | Labaton et al. | |
| 5,757,917 A | 5/1998 | Rose et al. | |
| 5,761,306 A | 6/1998 | Lewis | |
| 5,781,632 A | 7/1998 | Odom | |
| 5,790,667 A | 8/1998 | Omori et al. | |
| 5,790,677 A | 8/1998 | Fox et al. | |
| 5,809,144 A | 9/1998 | Sirbu et al. | |
| 5,815,665 A | 9/1998 | Teper et al. | |
| 5,825,881 A | 10/1998 | Colvin, Sr. | |
| 5,826,245 A | 10/1998 | Sandberg-Diment | |
| 5,850,442 A | 12/1998 | Muftic | |
| 5,878,141 A | 3/1999 | Daly et al. | |
| 5,878,337 A | 3/1999 | Joao et al. | |
| 5,880,446 A | 3/1999 | Mori et al. | |
| 5,883,810 A | 3/1999 | Franklin et al. | |
| 5,887,065 A | 3/1999 | Audebert | |
| 5,903,830 A | 5/1999 | Joao et al. | |
| 5,903,878 A | 5/1999 | Talati et al. | |
| 5,909,492 A | 6/1999 | Payne et al. | |
| 5,937,068 A | 8/1999 | Audebert | |
| 5,943,423 A | 8/1999 | Muftic | |
| 5,953,710 A | 9/1999 | Fleming | |
| 5,956,699 A | 9/1999 | Wong et al. | |
| 5,987,440 A | 11/1999 | O'Neil et al. | |
| 5,988,497 A | 11/1999 | Wallace | |
| 5,991,411 A | 11/1999 | Kaufman et al. | |
| 5,991,413 A | 11/1999 | Arditti et al. | |
| 5,995,626 A | 11/1999 | Nishioka et al. | |
| 5,999,624 A | 12/1999 | Hopkins | |
| 6,005,939 A | 12/1999 | Fortenberry et al. | |
| 6,012,039 A | 1/2000 | Hoffman et al. | |
| 6,012,045 A | 1/2000 | Barzilai et al. | |
| 6,014,650 A | 1/2000 | Zampese | |
| 6,029,150 A | 2/2000 | Kravitz | |
| 6,029,151 A | 2/2000 | Nikander | |
| 6,029,890 A | 2/2000 | Austin | |
| 6,047,270 A | 4/2000 | Joao et al. | |
| 6,052,675 A | 4/2000 | Checchio | |
| 6,065,117 A | 5/2000 | White | |
| 6,108,644 A | 8/2000 | Goldschlag et al. | |
| 6,161,183 A | 12/2000 | Saito et al. | |
| 6,163,771 A | 12/2000 | Walker et al. | |
| 6,173,269 B1 | 1/2001 | Solokl et al. | |
| 6,173,400 B1 | 1/2001 | Perlman et al. | |
| 6,205,437 B1 | 3/2001 | Gifford | |
| 6,226,624 B1* | 5/2001 | Watson | G06Q 20/40 705/44 |
| 6,236,981 B1 | 5/2001 | Hill | |
| 6,315,193 B1 | 11/2001 | Hogan | |
| 6,324,525 B1 | 11/2001 | Kramer et al. | |
| 6,339,766 B1 | 1/2002 | Gephart | |
| 6,343,279 B1 | 1/2002 | Bissonette et al. | |
| 6,381,587 B1 | 4/2002 | Guzelsu | |
| 6,422,462 B1 | 7/2002 | Cohen | |
| 6,456,984 B1 | 9/2002 | Demoff et al. | |
| 6,493,685 B1 | 12/2002 | Ensel et al. | |
| 6,529,725 B1 | 3/2003 | Joao et al. | |
| 6,636,833 B1 | 10/2003 | Flitcroft et al. | |
| 6,658,568 B1 | 12/2003 | Ginter et al. | |
| 6,678,664 B1 | 1/2004 | Ganesan | |
| 6,694,387 B2 | 2/2004 | Wagner | |
| 7,003,495 B1 | 2/2006 | Burger et al. | |
| 7,080,037 B2 | 7/2006 | Burger et al. | |
| 7,111,172 B1 | 9/2006 | Duane et al. | |
| 7,117,172 B1 | 10/2006 | Black | |
| 7,383,213 B1 | 6/2008 | Walter | |
| 7,676,431 B2 | 3/2010 | O'Leary et al. | |
| 7,765,136 B2 | 7/2010 | Northington et al. | |
| 8,433,658 B2 | 4/2013 | Bishop et al. | |
| 2001/0014878 A1 | 8/2001 | Mitra et al. | |
| 2001/0034689 A1 | 10/2001 | Heilman, Jr. | |
| 2001/0047336 A1 | 11/2001 | Maycock, Jr. et al. | |
| 2002/0055911 A1 | 5/2002 | Guerreri | |
| 2002/0062310 A1 | 5/2002 | Marmor et al. | |
| 2002/0099665 A1 | 7/2002 | Burger et al. | |
| 2002/0123938 A1 | 9/2002 | Yu et al. | |
| 2002/0133412 A1* | 9/2002 | Oliver | G06Q 30/02 705/26.35 |
| 2002/0152158 A1 | 10/2002 | Paleiov et al. | |
| 2004/0034598 A1 | 2/2004 | Robinson | |
| 2005/0278538 A1* | 12/2005 | Fowler | H04L 63/102 713/182 |
| 2009/0119205 A1 | 5/2009 | Keresman, III et al. | |
| 2010/0241570 A1 | 9/2010 | Keresman, III et al. | |
| 2012/0191609 A1 | 7/2012 | Keresman, III et al. | |

FOREIGN PATENT DOCUMENTS

| | | |
|---|---|---|
| JP | 896034 A | 4/1996 |
| JP | 9212549 A | 8/1997 |
| JP | 9282371 A | 10/1997 |
| JP | 10171909 A | 6/1998 |
| JP | 10207946 A | 8/1998 |
| WO | 9001199 | 2/1990 |
| WO | 9304425 | 3/1993 |
| WO | 9821679 | 5/1998 |

(56) References Cited

OTHER PUBLICATIONS

Endeshaw, "The Proper Law for Electronic Commerce", Information and Communications Technology Law, 1998, pp. 5-13, vol. 7, Issue 1.
Ferranti, "Businesses bracing for on-line transactions (Zona Research survey)", Network World Canada, 1998, p. 6, vol. 8, Issue 6.
Goldberg, "Agents of change: Virtual credit-card swiper makes banks feel secure", Computerworld, 1995, p. 38, vol. 30, Issue 1.
"Hitachi Commerce Solution Shopping System Mall Establishment Guide", Hitachi Ltd., 1998, pp. 1-3, Version 2.

\* cited by examiner

SECURE AND EFFICIENT PAYMENT PROCESSING SYSTEM

CROSS-REFERENCE TO RELATED APPLICATIONS

This application is a continuation of U.S. patent application Ser. No. 14/026,458, filed Sep. 13, 2013, which is a continuation of U.S. patent application Ser. No. 12/251,853, filed Oct. 15, 2008, now U.S. Pat. No. 9,430,769, which claims the benefit of U.S. Provisional Application No. 60/980,061, filed Oct. 15, 2007, all of which are incorporated herein by reference in their entirety.

BACKGROUND OF THE INVENTION

The present invention relates to the art of Internet commerce. It finds particular application in conjunction with Internet credit and/or debit transactions, and will be described with particular reference thereto. However, it is to be appreciated that the present invention is also amenable to other like applications.

Internet commerce, or e-commerce as it is otherwise known, relates to the buying and selling of products and services over the Internet. The convenience of shopping over the Internet has sparked considerable interest in e-commerce on behalf of both buyers and sellers. Internet sales or like transactions have been typically carried out using standard credit and/or debit cards such as Visa®, MasterCard®, Discover®, American Express®, or the like. However, while widely used for more traditional face-to-face transactions, use of these standard cards and their associated processing systems in connection with e-commerce presents certain difficulties.

In particular, for example, the standard card transactions typically involve a relatively high number of intermediaries that are used in processing the transaction from an initial purchase request, through authentication and authorization, and ultimately to settlement. In addition to the actual buyer and seller, the cast involved in ultimately completing the transaction through to settlement typically entails member banks including a merchant or acquiring bank and an issuing bank. Often, an Internet processor (e.g., Cybercash), member service provider (MSP), or an independent sales organization (ISO) is also involved. Additionally, third party processors, agent banks, and/or deposit banks are commonly employed. As each intermediary charges a bulk, per-transaction, percentage, or other like fee for its role in handling the transaction, the total transaction cost grows with each additional intermediary employed. Consequently, streamlining transaction processing and elimination of intermediaries beneficially holds transaction costs down.

Buyer confidence and security are also issues facing Internet commerce.

The fact that e-commerce transactions are not carried out face-to-face often creates apprehension in a potential buyer regarding transactions. This apprehension is fueled by uncertainty of the reputation or quality of the seller with whom they are dealing and the security of their credit and/or debit card information or other personal information (e.g., address, credit card number, phone number, etc.) typically submitted along with a traditional credit or debit card e-commerce transaction. Additionally, the account holders, sellers and financial institutions are concerned about safeguarding against fraudulent or otherwise unauthorized transactions.

For example, once an initial transaction has taken place, wherein a customer or account holder provides their identification and account information to a seller, the seller, whether operating via the Internet or via a traditional brick and mortar store front, has all the information needed to accidentally or fraudulently charge a customer's account for goods or services that were not actually purchased. Furthermore, every employee of the seller who comes into contact with the customer identification and account information has the ability to use that information to initiate fraudulent transactions.

Similarly, sellers or merchants as well as funding sources are concerned that purchases are made by valid account holders. As outlined above, the fact that someone has access to an account number and other identifying information is not a guarantee that a customer is the authorized account holder. For example, children can use a parent's credit cards without permission, resulting perhaps in returned merchandise. Credit cards or account information can be lost or stolen and used by unauthorized personnel to make purchases resulting in one of the account holder, the merchant, or the funding source suffering a theft loss. Additionally, data entry errors and the like can result in multiple charges for a single purchase.

Yet another issue is convenience for the buyer. As more and more transactions are carried out online, the repeated typing of required transaction information such as, for example, name, credit or debit account information, and/or shipping address information becomes tedious and aggravating. There is a need to identify a valid account holder which identification is recognized and subsisting for a plurality of transactions, or a limited period of time, or for a limited purchasing amount. Furthermore, writing checks to settle accounts is a tedious and often overlooked task resulting in delayed payment for sellers and late charges for consumers.

The present invention contemplates a new and improved transaction processing system and technique for carrying out credit and/or debit transactions over the Internet that overcomes the above-referenced problems and others.

BRIEF SUMMARY OF THE INVENTION

In accordance with one aspect of the present invention, a method for carrying out commercial transactions is provided. The method includes establishing a transaction processing system on an electronic communications network, and establishing an account within the transaction processing system for a corresponding account holder. If the corresponding account holder is a true account holder, then either the system, or the holder, may selectively set a window of acceptable, authenticated transactions, wherein the window is comprised of either a dollar amount, a timeout period, or a maximum number of transactions. One or more descriptions of acceptable future commercial transactions related to the account are obtained from the account holder. Commercial transactions carried out via the transaction processing system are administered, and it is verified that administered commercial transactions related to the account meet one or more of the descriptions obtained.

In accordance with another aspect of the present invention, a method of processing commercial transactions is carried out over the Internet between account holders and participating merchants. The method includes establishing account privileges for each account holder's account. The privileges defining boundaries outside of which transactions are not to be authorized. A buyer's purchase request is received from a participating merchant indicating that the buyer desires to carry out a transaction with the merchant in which the buyer is purchasing one or more selected items from the merchant. The buyer is authenticated as an account holder, and transaction details are received from the participating merchant. The transaction details including a cost for the selected items. Authorizing completion of the transaction occurs when the transaction details do not violate established account privileges and the account holder's account is full enough to cover the cost.

One advantage of non-limiting embodiments of the invention is found in an automated account settlement aspect that includes reasonableness checking of submitted charges.

Another advantage of non-limiting embodiments of the invention resides in immediate and automatic notification generation when out of tolerance charges are submitted.

Another advantage of non-limiting embodiments of the invention is that buyers and sellers are protected from fraudulent or otherwise unauthorized transactions.

Yet another advantage of non-limiting embodiments of the invention is that transaction costs are reduced to the extent that streamlined processing reduces intermediaries that would otherwise contribute to the transaction costs.

Another advantage of non-limiting embodiments of the invention is that electronic transactions can be processed more efficiently by keeping an authentication session open for multiple transactions based on custom account holder privileges, thereby minimizing the number of authentication processes that are performed and the amount of processing power required by authentication systems.

Another advantage of non-limiting embodiments of the invention is improved and faster transaction times for account holders and merchants, resulting from account holders' ability to customize account privilege information for their respective accounts.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
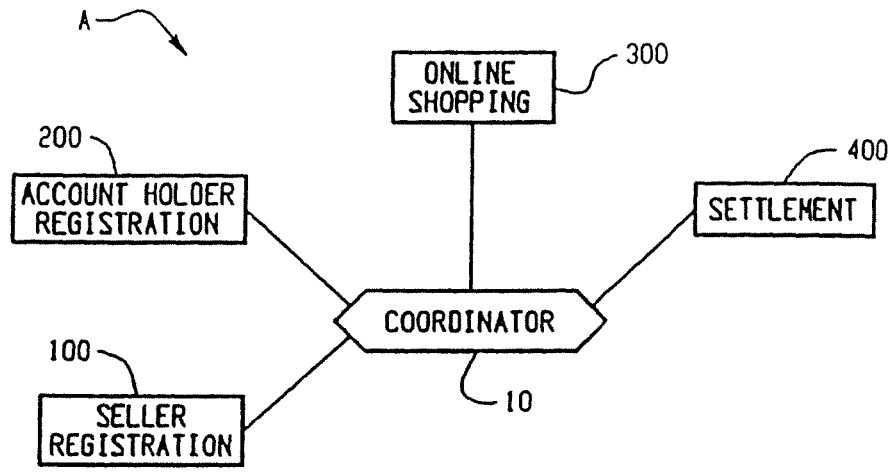
FIG. 1 is a flow chart showing a high level overview of an online credit/debit transaction processing system in accordance with aspects of the present invention.

With reference to FIG. 1, a central transaction coordinator 10 administers a number of different yet inter-dependent processes in a commercial Internet credit/debit transaction processing system A. The processes administered by the coordinator 10 include: (i) a seller registration process 100 wherein merchants or sellers are signed up for participation in the transaction processing system A; (ii) an account holder registration processes 200 wherein buyers or consumers are signed up as account holders for participation in the transaction processing system A; (iii) an online shopping process 300 wherein buyers or consumers engage in online commercial transactions with merchants or sellers; and, (iv) a settlement process 400 wherein completed commercial transactions are confirmed and settlement information forwarded directly to a funding source for billing and payment processing. In addition, the coordinator 10 itself optionally acts as the funding source. However, in the interest of simplicity and clarity, in the following description, the discussion is directed to embodiments employing a third party funding source.

Figure 2:
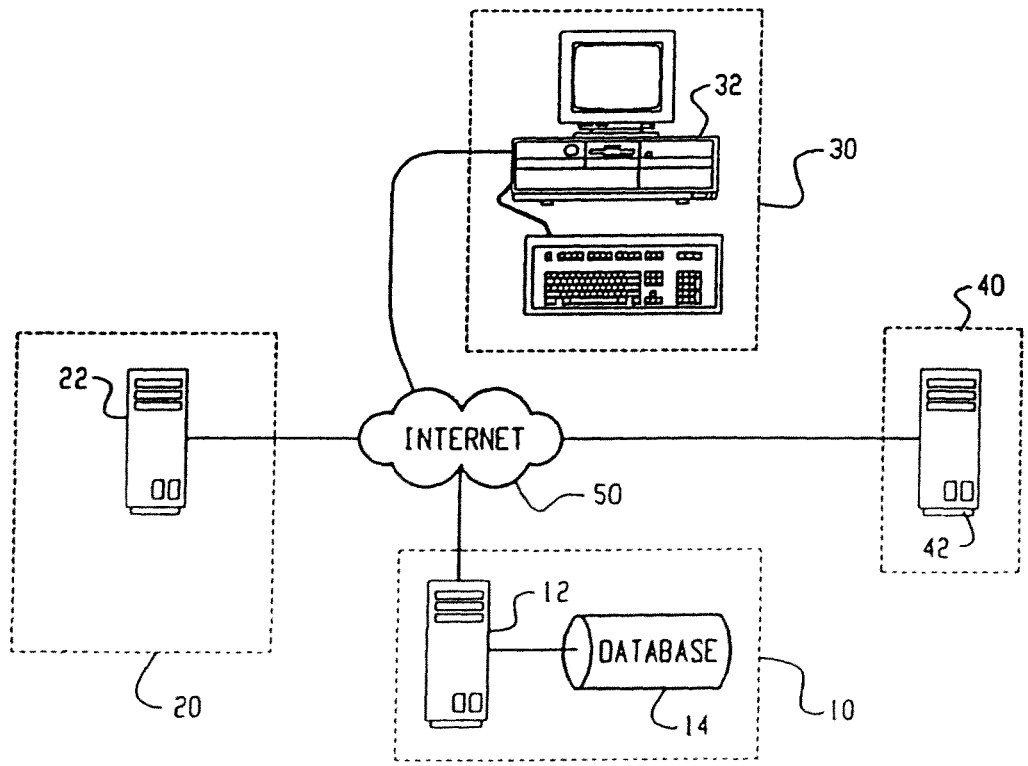
FIG. 2 is a diagrammatic illustration showing Internet connected participants in an online credit/debit transaction processing system in accordance with aspects of the present invention.

With further reference to FIG. 2, in a preferred embodiment, the coordinator 10 maintains a presence on the Internet 50 or other like online network via a server 12. A merchant or seller 20 also maintains a presence on the Internet 50 via a server 22. A buyer or account holder 30 gains access to the seller 20 and/or the coordinator 10 over the Internet 50 using a computer 32 with an appropriate web browser or other like software running thereon. Of course, the transaction processing system A is preferably administered to multiple similarly situated sellers 20 and buyers 30. However, in the interest of simplicity herein, only a one of each is shown in FIG. 2. Additionally, a funding source 40 maintains a presence on the Internet 50 via a server 42. The funding source 40 extends credit for credit accounts or holds deposits for debit accounts created on behalf of account holders participating in the transaction processing system A. Moreover, it is to be appreciated that the security of the transaction processing system A is further enhanced by encrypting, with known encryption techniques, communications relayed or otherwise transmitted over the Internet 50.

Figure 3:
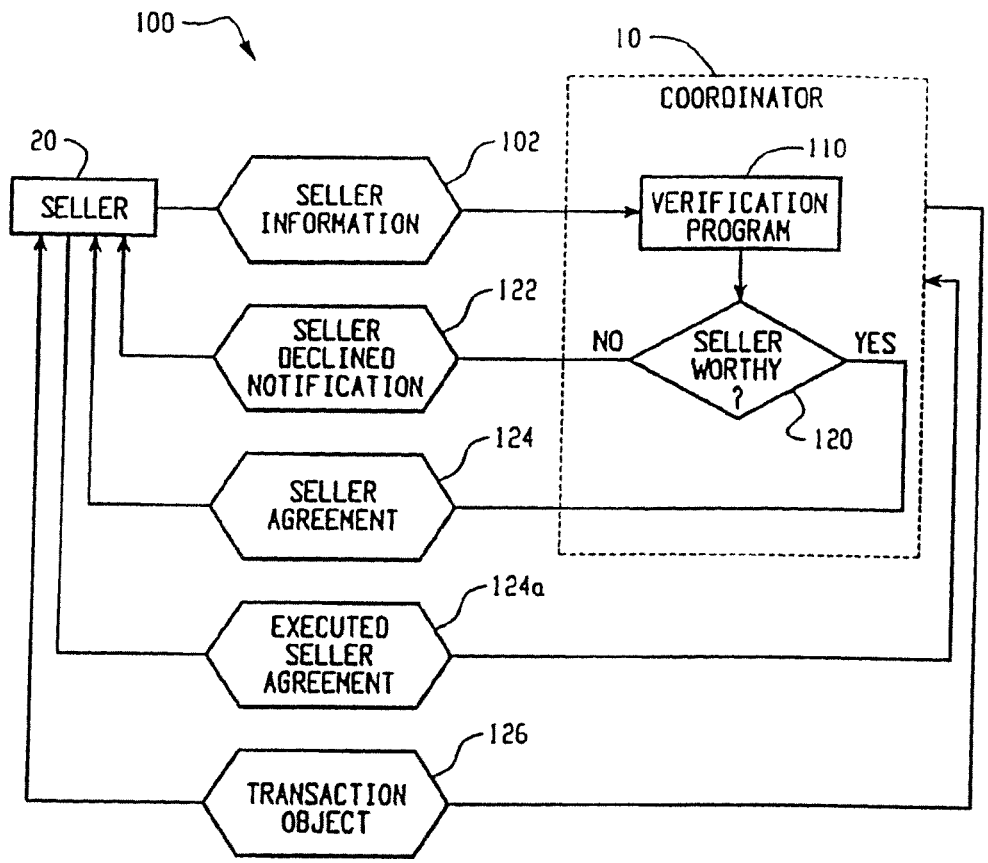
FIG. 3 is a flow chart showing a process for registering sellers for participation in an online credit/debit transaction processing system in accordance with aspects of the present invention.

With further reference to FIG. 3, in the seller registration process 100, an interested merchant or seller 20, preferably doing business on the Internet 50 via their server 22, is registered for participation in the transaction processing system A administered by the transaction coordinator 10. The seller registration process 100 begins with the coordinator 10 receiving seller information 102 (e.g., financial information, physical address, category of goods or services sold, Internet address, e-mail address, etc.) from the seller 20. Online or over the Internet 50, this is optionally accomplished by receiving the seller information 102, perhaps encrypted, via the coordinator's server 12. Using the received seller information 102, the worthiness of the seller 20 for participation in the transaction processing system A is evaluated.

Preferably, a verification program 110 is applied to evaluate the seller 20 based on the seller information 102 received by the coordinator 10. The verification program 110, optionally running on the coordinator's server 12, is carried out using a predetermined or otherwise selected algorithm that acts on quantifiable values representing the seller information 102. In this manner, the seller's credit worthiness is determined and/or the seller's reliability and reputation for customer service and sound business practice is determined using objective, subjective, or a combination of objective and subjective criteria. Accordingly, the coordinator 10 ensures that the seller 20 is able to meet potential obligations. Moreover, account holders 30 participating in the transaction processing system A are reassured that they are patronizing high quality merchants or sellers with strong customer satisfaction guarantees.

In response to the evaluation, at decision step 120, the coordinator 10 decides whether or not the interested seller 20 is declined or approved for participation. If declined, a notification 122 is sent to the interested seller 20 and the seller registration process 100 ends. If approved, the coordinator 10 forwards a seller agreement 124 to the seller 20. Online or over the Internet 50, the seller agreement 124 is optionally forwarded from the coordinator's server 12 to the seller's server 22. The seller agreement 124 outlines the rights and responsibilities or duties of the seller 20 with respect to their participation in the transaction processing system A. After the seller 20 physically signs, electronically signs, or otherwise executes the seller agreement 124, it is returned to the coordinator 10, perhaps through the coordinator's server 12. Upon receipt of the executed seller agreement 124a, the coordinator 10 creates and maintains a record of the seller information 102, the seller's approval, the seller agreement 124, etc. Preferably, the record is electronically created and maintained in a coordinator's database 14 which is accessible by the coordinator 10, and optionally, the funding source 40.

Preferably, upon acceptance of the executed seller agreement 124a, the coordinator 10 forwards to the seller 20 a transaction object 126 which places a link on the seller's online shopping check-out page or otherwise runs on the seller's server 22. The object or link operates to integrate the transaction processing system A into, or otherwise allows the processing system A to be accessed through, the seller's online shopping system or Internet shopping web page or pages. Optionally, the coordinator 10 installs the object on the seller's server 22. Accordingly, account holders 30 shopping online or over the Internet 50 can access the object (e.g., by clicking the link on seller's check-out web page) and be automatically routed to the coordinator 10 for authentication and/or authorization. In this manner then, merchants or sellers 20 become registered for participation in the transaction processing system A.

Figure 4:
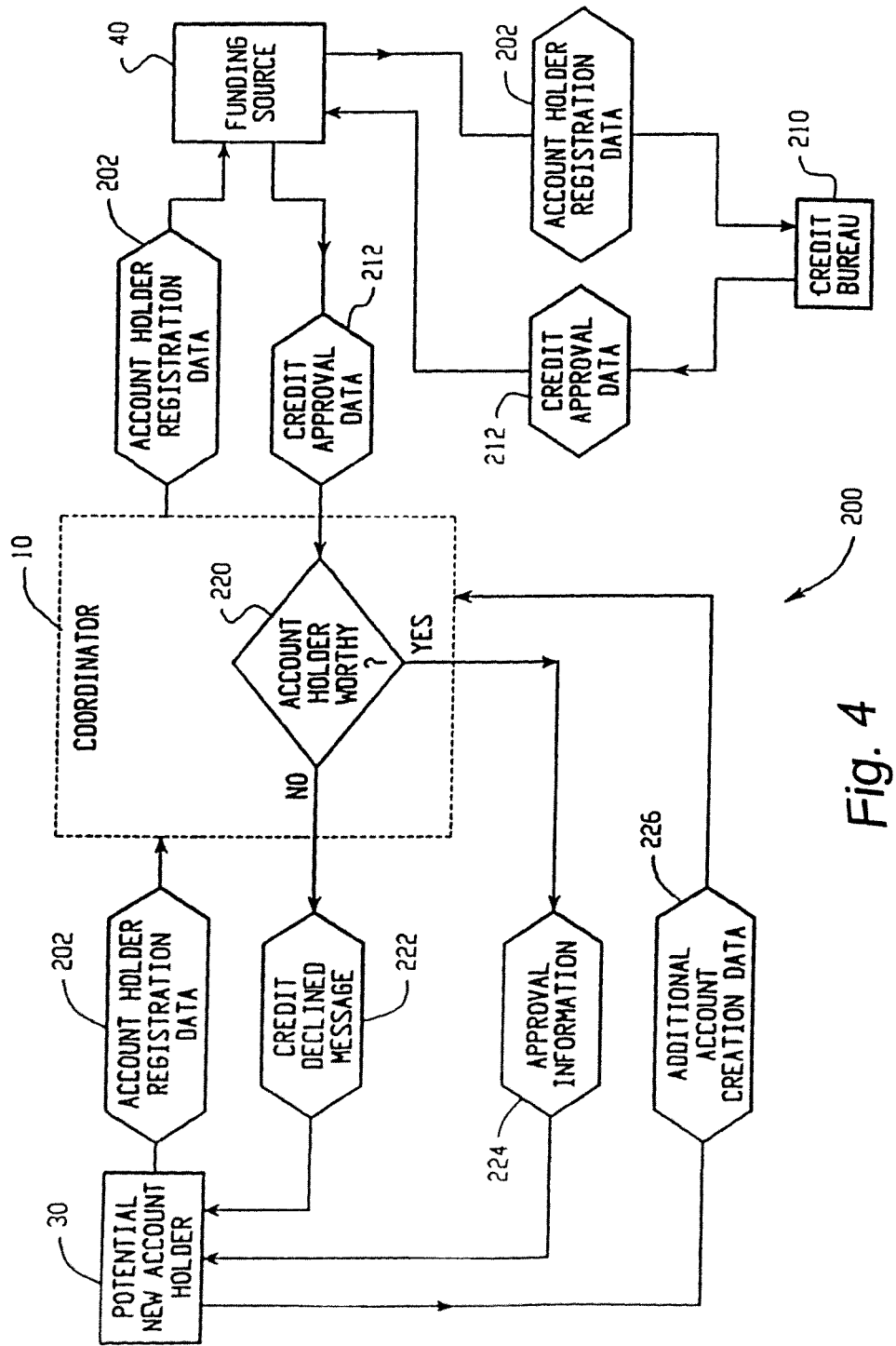
FIG. 4 is a flow chart showing a process for registering account holders for participation in an online credit/debit transaction processing system in accordance with aspects of the present invention.

With further reference to FIG. 4, in the account holder registration process 200, registration of a buyer or consumer to become an account holder 30 begins with a visit by the buyer to the coordinator 10. Optionally, over the Internet, the interested buyer or consumer, using an appropriate web browser, accesses an account holder registration page which is made available via the coordinator's sever 12. As the account holder registration process 200 continues, account holder registration data 202 (e.g., name, address, length at residence, own or rent residence, e-mail address, home phone number, work phone number, social security number, date of birth, mother's maiden name, employer, income, employment status, etc.) is collected or otherwise obtained by the coordinator 10 from the buyer or the potential new account holder 30 who is making application for participation in the transaction processing system A. Prior to accepting the consumer or buyer as a new account holder 30, their credit worthiness is evaluated.

Preferably, the coordinator 10 passes relevant account holder registration data 202 to the funding source 40. The relevant account holder registration data 202 is then analyzed for credit worthiness. Optionally, the data is analyzed by the funding source's own credit approval system, or it is passed on to one or more credit bureaus 210 for analysis. The analysis preferably includes the application of known credit approval techniques and algorithms which determine credit worthiness. Ultimately, credit approval data 212 (e.g., approval or denial, amount of credit, risk, etc.) is routed back to the coordinator 10 through the funding source 40.

Upon receipt of the credit approval data 212, the coordinator 10 decides, at decision step 220, if the potential new account holder 30 is worthy of participation in the transaction processing system A. Then the coordinator 10 notifies the potential new account holder 30 of the credit decision. That is to say, if credit is declined, a credit-declined message 222 is communicated to the potential account holder 30. On the other hand, if credit is approved, approval information 224 (e.g., the annual percentage rate, credit limit, etc.) is communicated to the potential new account holder 30 for acceptance. In a preferred embodiment, the credit approval or denial is communicated to an online potential new account holder 30 accessing the coordinator over the Internet 50 by displaying an appropriate web page from the coordinator's server 12 to the potential new account holder 30. Alternately, the credit approval or denial is communicated via e-mail to the potential new account holder's designated e-mail address previously obtained along with the account holder registration data 202. In any event, optionally, at this time, the potential new account holder 30 is advanced an initial, albeit preferably limited, line of credit and temporary password enabling him to immediately shop online at a registered seller 20 using the transaction processing system A administered by the transaction coordinator 10.

If approved and account holder status is still desired, along with an indication of acceptance, the account holder 30 supplies the coordinator 10 with additional account creation data 226 including a secret personal identification number (PIN) and the answers to a number of designated or otherwise selected security questions. The security questions are preferably questions to which only the account holder 30 is likely to know the answers (e.g., the account holder's first car, the name of the account holder's dog, the maiden name of the account holder's mother, etc.). Upon acceptance, the coordinator 10 creates and maintains a record for the account holder 30, preferably in electronic format on the coordinator's database 14. The account holder record includes the account holder registration data 202, credit approval data 212, approval information 224, acceptance, and the additional account creation data 226. In addition, a corresponding credit account is created with the funding source 40. Optionally, the account holder 30 may designate one or more existing credit or debit accounts for use in connection the transaction processing system A, in which case information pertaining thereto is collected and maintained in the account holder record.

The account holder record may also contain information or data relating to account privileges. In a preferred embodiment the account holder 30 has the option to customize or modify their account privileges. The account privileges are customized by the account holder 30, for example, by accessing the coordinator's server 12 over the Internet 50. For security purposes, the account holder is optionally authenticate as such, preferably, using the below described authentication procedure, prior to permitting any account modifications. However, at initial account creation, the below described authentication procedure is not employed. The account privileges are optionally set by the account holder 30 to limit the use of the account holder's account in the transaction processing system A. That is to say, the set account privileges may restrict the account so that purchases thereon are not authorized for specified participating merchants or sellers 20, so that automatically recurring transactions carried out absent the direct participation of the account holder 30 are not authorized, so that single purchases over a certain price limit are not authorized, so that aggregate per day purchases are limited to a desired level, and the like.

By manipulating the account privileges, the account holder 30 may selectively set up virtual purchase orders and control or limit the transaction authorization given by the coordinator 10. For example, the account privileges portion of the account holder record preferably identifies those registered merchants or sellers 20 for which the account holder 30 may desire or intend to do business and hence for which transactions on the account are to be authorized. Optionally, to add and delete registered sellers 20 from the list, the coordinator 10 provides selection boxes. For example, the account holder 30, interacting with the server 12 of the coordinator 10, to provide the additional account creation data 226, may choose to globally authorize or globally de-authorize all the registered sellers. Then the account holder 30 may switch the authorization state of individual sellers. For example, where the account holder globally authorizes all available registered sellers 20, the account holder 30 may then de-authorize particular individual sellers 20. For example, the account holder 30 de-selects merchants the account holder 30 does not intend to do business with, thereby deleting them from the authorized merchant list. Conversely, where the account holder 30 globally de-authorizes all available registered sellers 20, the account holder 30 may then select particular individual sellers, thereby adding them to the authorized merchant list. Other global restrictions optionally include, restricting authorization for single purchases exceeding a selected amount, or for aggregate purchases in a selected time period.

An account holder 30 selectively sets up a virtual purchase order via the account privileges by pre-defining transaction boundaries for an identified seller 20. The boundaries optionally include a limit on the transaction amount, a limit on the number of transactions for automatically or otherwise repeating transactions, a purchase order expiration data after which repeating transactions are not longer to be authorized, a frequency (e.g., weekly, monthly, etc.) at which repeating transactions are to be authorized, ranges and/or tolerances within which transaction amounts and/or dates are to fall, etc. In this manner, the authorization of anticipated transactions is controlled by the account holder 30 prior to the execution of the transactions. Consequently, accidental and/or fraudulent transactions are frustrated. Additionally, insomuch as authorization will be denied for transactions not in conformity with the boundaries of the virtual purchase order prior to charging the designated account, charge backs, billing disputes and the like will be reduced.

Figure 5:
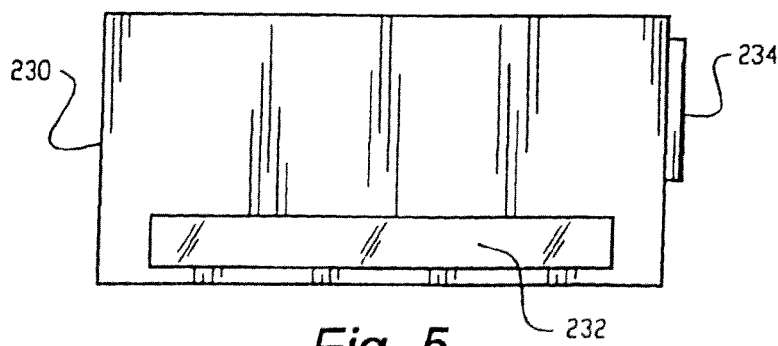
FIG. 5 is a diagrammatic illustration showing a credit token for use in connection with an online credit/debit transaction processing system in accordance with aspects of the present invention.

In any event, at the initial account creation, the coordinator 10 also assigns the account holder 30 an associated user identity which is unique to the account holder 30 and becomes part of the account holder's record (e.g., a self-selected user name, or an otherwise assigned alpha-numeric designation), and optionally, a corresponding credit token 230 (see FIG. 5) is issued to the account holder 30. The credit token 230 periodically (e.g., every 60 seconds) generates a non-predictable alpha-numeric code (preferably 6 characters in length) using a predetermined or otherwise selected algorithm. The algorithm used in generating the periodically changing non-predictable alpha-numeric code is preferably a function of an initial seed value and a time value obtained from an internal clock. The credit token 230 renders the code on an incorporated liquid crystal display (LCD) readout 232 or other like human-viewable display. Additionally, the credit token 230 provides an indicator as to the duration of the displayed code's validity (i.e., the time remaining before generation of the next non-predictable code). Accordingly, every period, the credit token 230 generates a dynamically changing non-predictable alpha-numeric code which (with the exception of the coordinator 10) is only available to the account holder 30 in possession of the credit token 230.

For each unique user identity, the coordinator 10 also independently generates a periodically changing non-predictable alpha-numeric code which is synchronized with and the same as the token generated code for the corresponding account holder 30 having that user identity. The independently generated and synchronized code is maintained with the corresponding account holder's record. Preferably, the coordinator 10 generates the synchronized code by running software which uses (i) an algorithm and (ii) an initial seed value which are both identical to that used by the corresponding token 230 and (iii) a time value from a clock which is synchronized with the token's internal clock. In this manner then, the alpha-numeric code from an account holder's credit token 230 and the independently generated alpha-numeric code maintained with the account holder's record are the same at any given time.

In an alternate preferred embodiment, the token 230 stores a defined set of discrete random or quasi-random numbers which are pre-loaded onto the token 230 at the time of the token's manufacture or programming. These numbers are preferably generated by an external system (e.g., a computer system or other random number generating device). The external system then delivers the number set to the token 230 for storage in the token's internal memory. Likewise, the same number set is delivered to and maintained with the corresponding account holder record.

Generating the numbers on an external system relieves the token 230 of a significant amount of computational overhead. By reducing the computational overhead, energy savings are realized that enable the token to use smaller, less powerful energy sources.

The random numbers are dispensed by the token 230 to a user by pressing a button on the token 230 or otherwise signaling the token 230. Optionally, the token 230 may need to be activated by using the secret PIN that was assigned to, or chosen by, the account holder 30 at the time of registration. In any event, a dispensed number from the token 230 may then be cross referenced against those in the corresponding account holder record. In this way, authentication can be carried out.

In an alternate embodiment, a potential new account holder 30 may contact the funding source 40 directly for registration to participate in the transaction processing system A. In this case, the funding source carries out substantially the same account holder registration process 200 and forwards the account holder record to the coordinator 10.

Figure 6A:
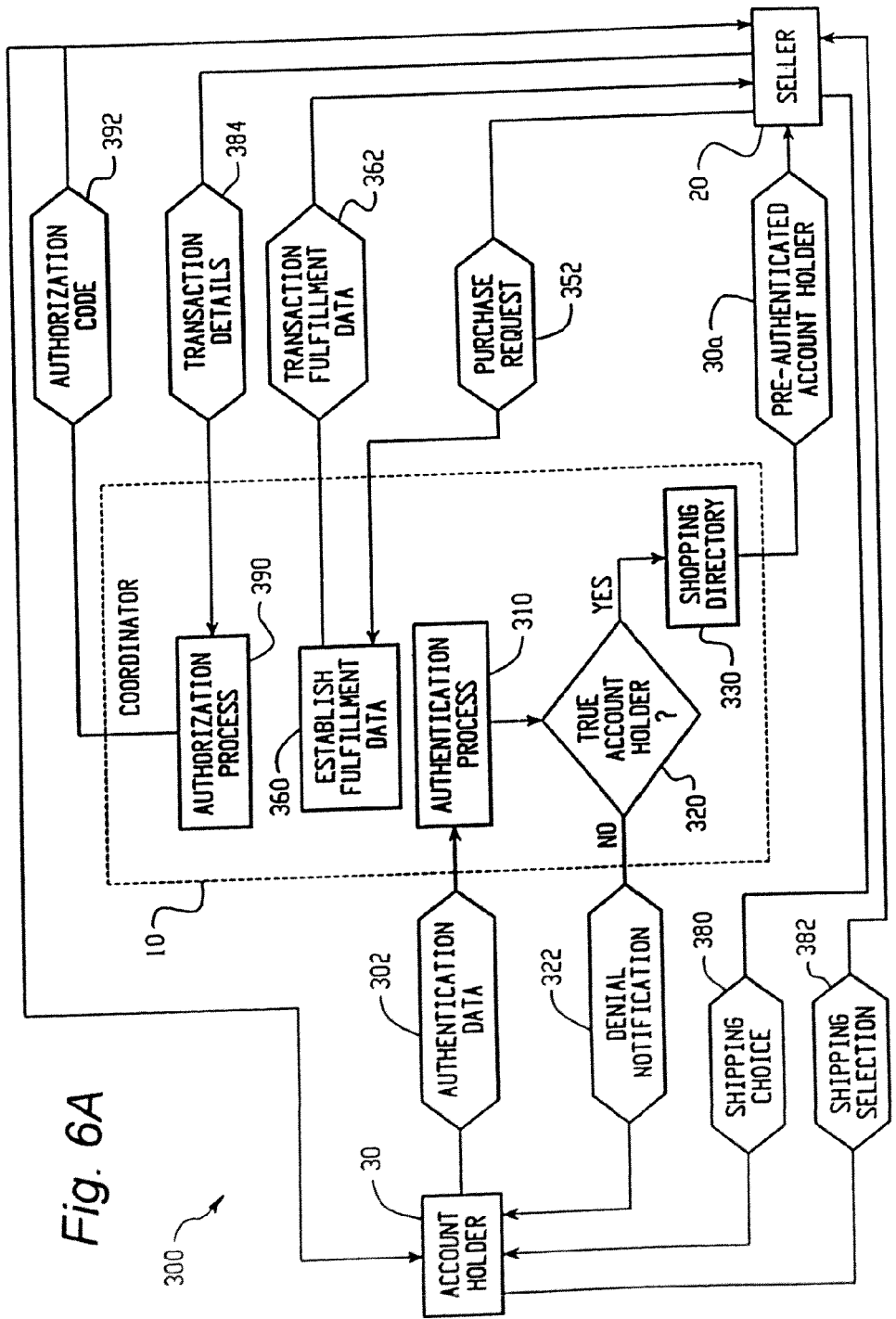
FIGS. 6A and 6B are flow charts showing an online shopping experience and related processing in accordance with aspects of the present invention with pre-shopping authentication and post-shopping authentication, respectively.
Figure 6B:
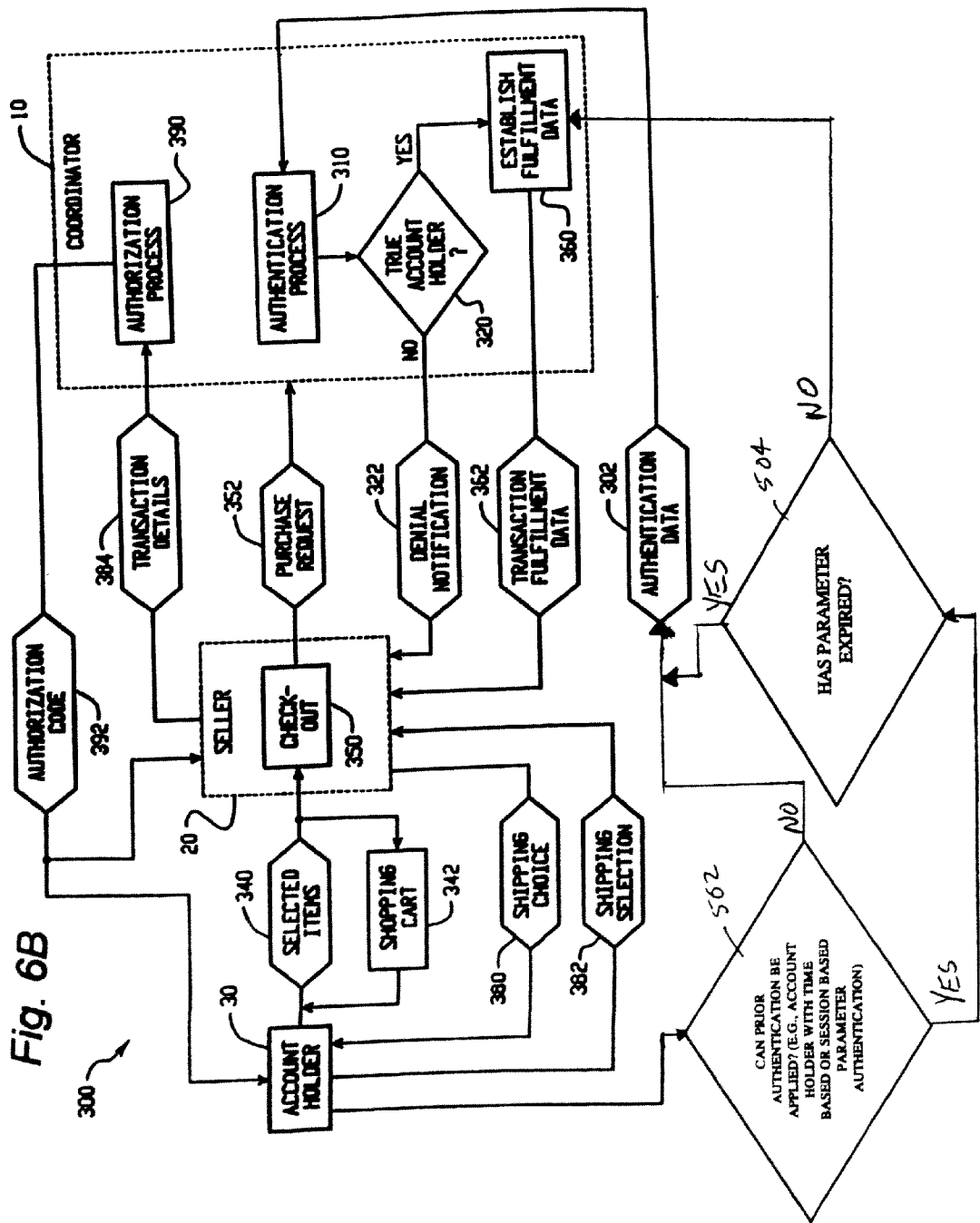

With further reference to FIGS. 6A and 6B, in a preferred embodiment, an online or Internet shopping experience or process 300 begins with an account holder 30 contacting the coordinator 10 (e.g., accessing the coordinator's online or Internet shopping portal using an appropriate web browser) or otherwise requesting a web page from or linking to the coordinator's server 12. At this juncture, the account holder 30 is given the option to pre-authenticate their identity prior to engaging in any particular commercial transactions with the participating merchants or sellers. Authentication is preferably accomplished by the coordinator 10 collecting from the account holder 30 authentication data 302 having one or more elements including the account holder's user identity, PIN, and/or token generated alpha-numeric code. Optionally, one or more elements of the authentication data 302 are entered manually by the account holder 30. Alternately, one or more of the elements are stored or otherwise maintained on the computer 32 being employed by the account holder 30 to access the coordinator's server 12 such that they are automatically entered where appropriate. For example, with regard to the non-predictable alpha-numeric code, rather than having a separate physical token 230, the "token" is optionally an object running on the account holder's computer 32 which enters or displays the alpha-numeric code when accessed. Alternately, a separate physical token 230 optionally includes an interface 234 (see FIG. 5) through which it is connected to the account holder's computer such that the token generated alpha-numeric code is read directly from the token 230 without manual entry.

In any event, the coordinator 10 runs the authentication data 302 through an authentication process 310 which compares the entered or otherwise collected authentication data 302 with the corresponding data in the account holder record having the same user identity as that included with the authentication data 302. The coordinator 10 then determines, at decision step 320, whether or not the alleged account holder 30 is an authentic account holder previously registered using the account holder registration process 200. Of course, where the user identity included with the authentication data 302 does not have a corresponding account holder record or is otherwise invalid, the authentication is denied or fails and the alleged account holder 30 and/or involved seller 20 is sent a denial notification 322. Additionally, where the authentication data 302 and corresponding data in the account holder record having the same user identity do not match, the authentication is also denied or fails and the alleged account holder 30 and/or involved seller 20 is again sent the denial notification 322. Only when there is an identical match between the authentication data 302 and the account holder record does the accessing account holder 30 become authenticated and/or positively identified as the true account holder having the corresponding user identity.

In one preferred embodiment, the authentication or positive identification is carried out, e.g., as described in the previously referenced U.S. Pat. Nos. 5,168,520 and 4,720,860. Alternately, other authentication methods or procedures may be employed that positively identify the account holder 30, e.g., challenge response, quick log mode, other one or more factor authentication methods (such as a static user name and password or PIN), smart cards, the aforementioned number dispenser, biometric authentication (such as fingerprint recognition or retinal scanners), etc. These authentication techniques ensure that the coordinator 10 is able to independently make a positive identification of the account holders 30.

With particular reference now to FIG. 6A, next, the account holder 30 requests, or the coordinator's server 12 otherwise displays, a web page or the like with a shopping directory 330 listing participating merchants or sellers 20 that are registered with the transaction processing system A system administered by the coordinator 10. The account holder 30 is then free to select the participating seller 20 of his choice and shop as a pre-authenticated account holder 30a.

With particular reference now to FIG. 6B, alternately, the account holder 30 accesses the seller's online store or Internet shopping site directly from the seller's server 22 and shopping is carried out absent pre-authentication. At the seller's site, the buyer or account holder 30 selects items 340 of goods and/or services which are desired for purchasing. Preferably, these goods or services are then placed into a virtual shopping cart 342. If more shopping is desired, the process loops back to product selection and other like shopping web pages made available from the seller's server 22. On the other hand, if shopping is complete, the process continues on to check-out 350. When the buyer or account holder 30 accesses the transaction object 126 or link previously established on the participating merchant's or seller's check-out page 350, the buyer or account holder 30 is routed to the coordinator 10 along with a purchase request 352 indicating the buyer desires to carry out a commercial transaction with the referring participating seller 20. Preferably, the transaction in question includes the buyer or account holder 30 purchasing one or more selected items from the participating merchant or seller 20.

If not pre-authenticated, when the buyer or account holder 30 is routed to the coordinator 10, they are presented with an authentication page from the coordinator's server 12. At this point, using the same authentication procedure 310 as used in pre-authentication, the buyer is authenticating and/or positively identified as an account holder 30 having a unique user identity. If pre-authenticated, the account holder 30 bypasses this authentication step.

In any event, provided authentication is complete and successful, the coordinator 10, at process step 360, establishes transaction fulfillment data 362. The transaction fulfillment data 362 identifies information which is used by the participating seller 20 to fulfill their obligation(s) to the account holder 30 for the commercial transaction in which they are currently engaged. For example, the transaction fulfillment data 362 preferably includes a delivery destination for the items selected for purchase in the transaction. For physical goods, the delivery destination may be a shipping address, and for downloaded content, downloaded software, digital goods or services, and other like items, the delivery destination may be an e-mail address or the account holder's networked computer 32.

With continued reference to FIG. 6B, an alternative embodiment is shown which permits an account holder to designate a authentication window permitting the authentication of multiple transactions in the window without having to repeatedly perform the authentication process 310. In other words, as opposed to requiring the use of a unique number/code to identify a particular transaction, a session based authentication identifies an authenticated user, i.e. a true account holder, throughout the window defined by preselected threshold parameters. For example, if the account holder knows that he/she will occasionally perform a group of transactions, and it is desired not to have to go through the authentication process for each transaction in the group, then the account holder can preset the system to accept a prior authentication in a manner to bypass the authentication process 310 so that the group transactions are not unique individually, but rather the entire session can authenticate multiple transactions related by the session definition. More particularly, a session can be identified by a preset number of transactions, a time limited window where the prior authentication is acceptable, or to a limited dollar amount in which the cumulative transactions must fall within.

As can be seen with reference to FIG. 6B, if a true account is one wherein a prior authentication code can be accepted 502, then the preset parameters identifying an authenticated session 504 need to be checked. If the parameters have not timed out, then the prior authenticated true account holder may immediately have the transaction process directed to establishing the fulfillment data 360, but if the prior authentication session data has expired, as in the time window parameter, or has been used up, as in the dollar amount or number of transactions parameter data, then the authentication process 310 must be re-initiated for authenticating the desired transaction.

The foregoing alternative embodiment of session based authentication avoids the disadvantages of requiring a unique authentication process for each individual transaction of an account holder, when the account holder knows those transactions in a predetermined session should all be authenticated without a problem. Associating the transactions in a matter in an authenticated session provides greater efficiency in the authentication process per transaction and relieves the account holder of the task of having to repeatedly go through the authentication process. Several alternatives can also be envisioned as the selected thresholds for defining a time out session beyond the foregoing dollar, time or transaction number or windows. For example, the number of transactions may be those that are completed at a particular merchant/URL at which the transactions are occurring, or could be at multiple merchants/URL locations. The dollar amount could be related to the time window to accommodate relatively smaller purchases over extended time, or only a few high dollar purchases in a smaller window. It is important within the present embodiment to recognize that the session is intended to accomplish multiple transactions, all of which can be authenticated by a single authentication process and to avoid the inconvenience of having to assign a unique transaction code to each transaction in a session comprised of a plurality of transactions.

Figure 6C:
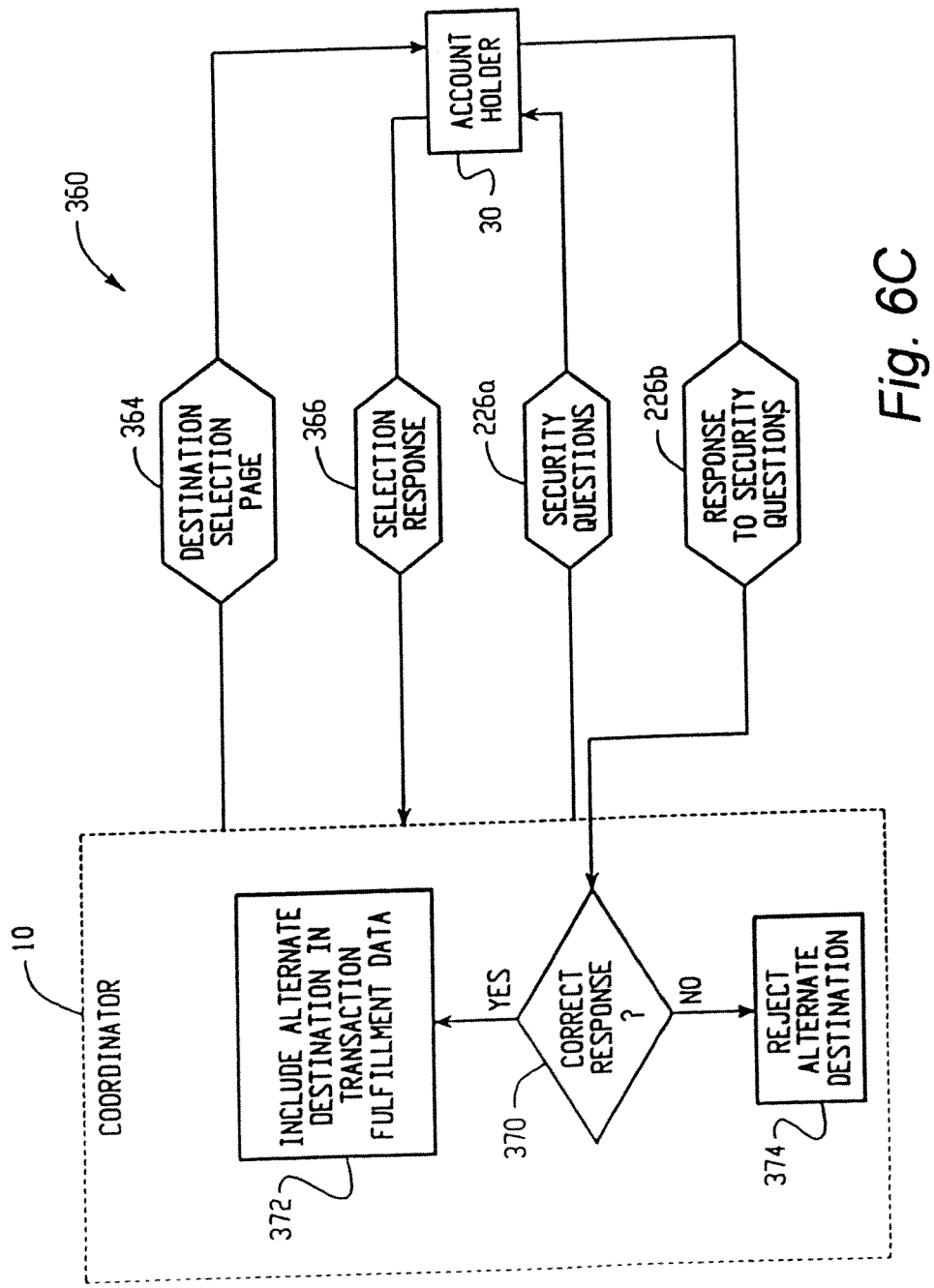
FIG. 6C is a flow chart showing implementation of additional security measures invoked by certain delivery destination conditions which are selected in connection with an online credit/debit transaction processing system in accordance with aspects of the present invention.

With further reference to FIG. 6C, in a preferred embodiment, previously designated (e.g., at account creation) default delivery destinations for the various types of goods or services are maintained in the account holder's record. As a rule, the coordinator 10 uses these default designations in establishing the transaction fulfillment data 362. However, at a destination selection web page 364 presented to the account holder 30 by the coordinator 10, the account holder 30 may optionally designate, via a selection response 366, an alternate destination as the delivery destination.

In a preferred embodiment, if the alternate destination differs from the default destination or if the destination is a direct download to the buyer's or account holder's computer 32, an additional security precaution is invoked. More specifically, the coordinator 10 transmits one or more of the previously answered security questions 226a (i.e., the security questions to which the account holder 30 originally provided answers in connection with the submitted additional account creation data 226) to the buyer or account holder 30. The coordinator 10 then receives from the buyer or account holder 30 an answer 226b in response to each security question. The coordinator 10 then determines, at decision step 370, if the answers 226b are correct. As shown at process step 372, only when the newly received responses match the previously given answers in the account holder's record is the alternate or download destination included in the established transaction fulfillment data 362. Otherwise, as shown at process step 374, the alternate or download destination is rejected. Optionally, approved alternate destinations may also be stored in an account holder address book maintained with the account holder's record for convenient future access and use by the account holder 30.

Optionally, the delivery destination is a non-identifying destination such that anonymity of the account holder 30 is maintained with respect to the participating merchant or seller 20. For example, the non-identifying destination may be a post office box, or other neutral third party from which delivered goods are obtained by the account holder 30. Regardless of the delivery destination, once established, the transaction fulfillment data 362 is communicated by the coordinator 10, preferably online or over the Internet 50, to the participating seller 20, and the account holder 30 is routed back the participating seller 20 where they are optionally presented a shipping choice 380 including choice of shipping carrier (e.g., regular U.S. mail, Federal Express, UPS, etc.) and/or preferred shipping time (e.g., 1 month, 1 week, or next day delivery).

After the account holder 30 has made their selection 382, if any, with regard to shipping carrier and/or preferred shipping time, the transaction details 384 are transmitted from the seller 20 to the coordinator 10 where they are received for authorization processing 390. The transaction details 384 preferably include the total cost (with tax and shipping) for the selected items being purchased in the transaction. Additionally, the transaction details 384 identify the participating merchant or seller 20 and account holder 30 engaged in the transaction.

The authorization process 390 preferably has two parts, one is based upon the account holder's account having an amount of available credit or funds sufficient to cover the total cost of the transaction, the other is based upon the transaction details 384 not violating the limitations and/or restrictions set forth in the account privileges of the account holder record. If the transaction details 384 are not within the boundaries of a virtual purchase order and/or other global restrictions that may have been set up by the account holder 30, then authorization is denied. Otherwise, the authorization process 390 determines the availability of funds or credit. Optionally, if the account privileges have been violated in any way, a notification or warning regarding the same is forwarded to the account holder 30, preferably, via e-mail. In response to the warning, the account holder 30 may be given the option to override the denial of authorization, in which case authorization will be given.

Alternately, the account is optionally a debit account such that authorization is based upon the debit account having a sufficient amount of funds on deposit to cover the total cost of the transaction, or the account is a credit account such that authorization is based upon the credit account having a sufficient amount of available credit to cover the total cost of the transaction. In either case, when a sufficient amount of funds or credit is available to cover the total cost of the transaction, completion of the transaction is authorized, if not authorization is denied.

Optionally, the status of the account holder's account (credit or debit) is maintained along with the account holder's record in the coordinator's database 14 such that the coordinator 10 may directly authorize transactions. Alternately, the transaction details 384 are passed along to the funding source 40 which then authorizes the transactions. In either case, upon determining authorization (in the affirmative or in the negative), a corresponding authorization code 392 is established for the transaction. Preferably, the authorization code 392 along with the authorization result and the corresponding transaction details 384 are maintained in a transaction record, optionally, stored electronically in the coordinator's database 14. Additionally, an indication of the authorization outcome and the authorization code 392 are communicated to the participating merchant or seller 20 and account hold 30 which then act accordingly.

Figure 7:
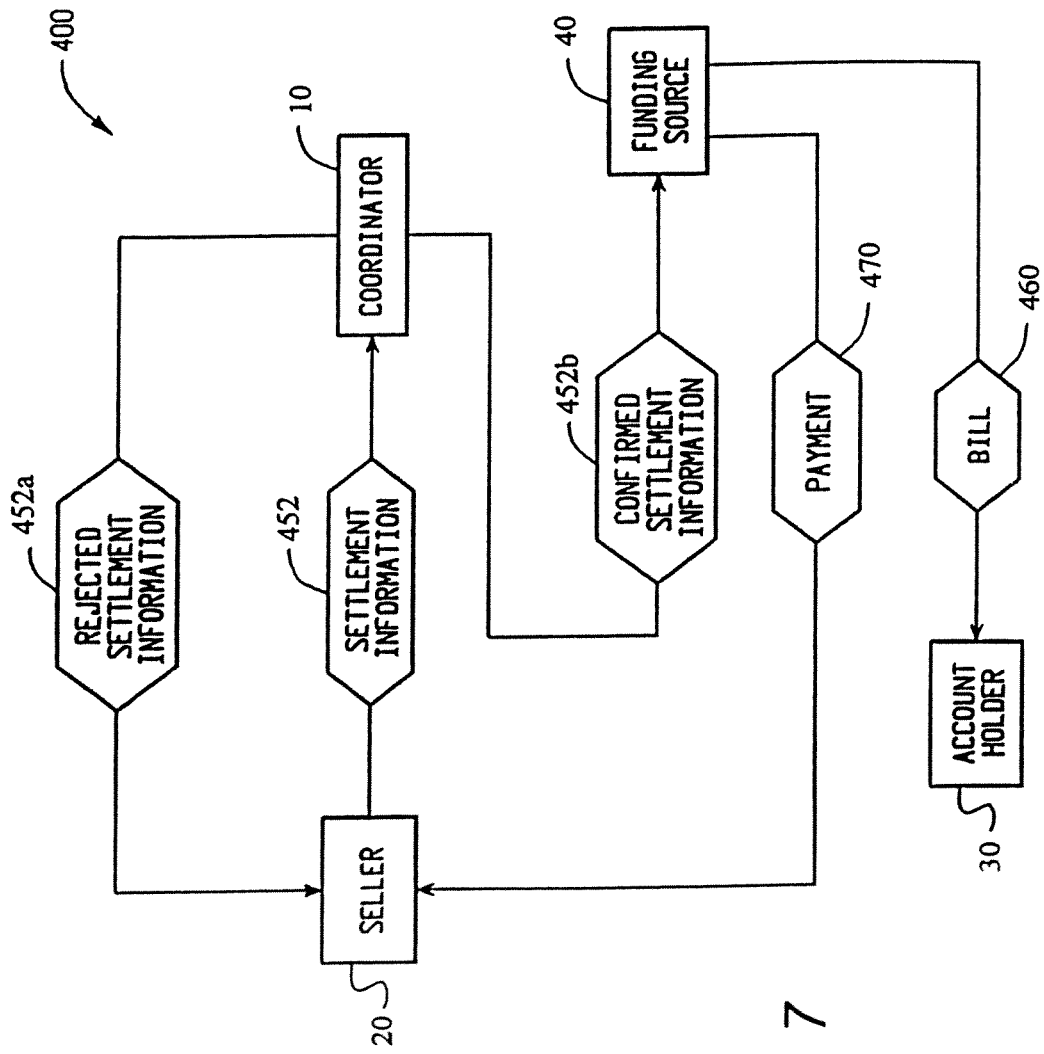
FIG. 7 is a flow chart showing a settlement process of an online credit/debit transaction processing system in accordance with aspects of the present invention.

With further reference to FIG. 7, the settlement process 400 for completed commercial transactions begins with the coordinator 10 collecting or otherwise obtaining settlement information 402 from the seller 30. Preferably, the settlement process 400 occurs periodically, e.g., daily, weekly, etc. Alternately, the settlement information 402 is obtained by the seller 20 routing settlement information 402 to the coordinator 10 or by the coordinator 10 automatically extracting settlement information 402 from the seller 20. For example, with regard to the automatic extraction of settlement information, when a seller's delivery process is executed thereby delivering purchased goods or services to the account holder 30, a seller's inventory database 24 (see FIG. 2) or other such seller database is accordingly updated to indicate delivery and completion of the particular transaction. In the settlement procedure 400 then, settlement information 402 corresponding to those transactions indicated in the seller's database 24 as having been completed is automatically retrieved by the coordinator 10 from the seller's database 24.

The settlement information 402 indicates that the seller 20 has fulfilled his obligations to an account holder 30 in connection with a particular authorized commercial transaction. The obtained settlement information 402 preferably includes the authorization code 392 and the corresponding transaction details 384 for the transaction in question. The coordinator 10 then matches the settlement information 402 to the corresponding transaction record having the same authorization code 392 to confirm or otherwise validate and approve settlement when the transaction details 384 in the settlement information 402 are substantially the same as the transaction details 384 in the transaction record. In particular, the total cost from the transaction details 384 reported in the settlement information 402 is optionally permitted to vary within a given tolerance from the total cost contained in the transaction details 384 of the transaction record. In the cases where there is an insufficient match, rejected settlement information 402a is returned to the seller 20.

In a preferred embodiment, periodically (e.g., at the end of each day), the coordinator 10 communicates confirmed settlement information 402b directly to the funding source 40, preferably over the Internet 50 or other online network. In turn, the funding source 40 acts accordingly on the confirmed settlement information 402b, e.g., sending bills 410 to the appropriate account holders 30 and reimbursing the appropriate merchants or sellers 20 with payment 420 using known billing and payment processing procedures and methods. As the settlement information 402 has already been confirmed by the coordinator 10, optionally, the funding source 40 does not employ independent confirmation of the settlement information 402 and thus may act on the confirmed settlement information 402b more readily without additional procedures for validating it.

In this manner, transactions conducted in the transaction processing system A are streamlined as compared to traditional transaction processing systems. In the traditional system, buyers or account holders make purchases using a traditional credit card. The credit card number, expiration date, and accompanying personal information is then forwarded to numerous different intermediaries in an attempt to positively identify and/or authenticate the buyer as the credit card owner. Still further intermediaries are often employed to then authorize a particular transaction and the information is again routed to these additional intermediaries. As a result this system is inherently inefficient. In the transaction processing system A described herein, by providing positive user identification and/or authentication at check-out through the coordinator 10 and by integrating the authentication and authorization procedures 310 and 390, respectively, with the coordinator 10, desirable efficiencies are gained insomuch as the inefficient merchant banking system and the numerous intermediaries are avoided on both the purchase side and the settlement side.

The invention has been described with reference to the preferred embodiments. Obviously, modifications and alterations will occur to others upon reading and understanding the preceding detailed description. For example, the transaction processing system A is equally applicable to and adept at handling face-to-face transactions, telephone transactions, and the like, as it is at handling Internet transactions. It is intended that the invention be construed as including all such modifications and alterations insofar as they come within the scope of the appended claims or the equivalents thereof.

What is claimed is:

1. A method for facilitating session-based authentication for a plurality of e-commerce transactions for an account holder, comprising:

registering, with at least one computer system, a plurality of account holders, each account holder of the plurality of account holders corresponding to an account holder record containing account privilege information;

receiving, from an account holder of the plurality of account holders, user input setting the account privilege information for an account corresponding to the account holder;

receiving a transaction request for an e-commerce transaction between the account holder and a merchant, the transaction request comprising transaction details including a transaction value and a transaction time;

in response to the transaction request, performing, with at least one computer system, an authentication process comprising:
(i) prompting the account holder to input authentication data in response to the transaction request;
(ii) comparing the inputted authentication data to the account holder record corresponding to the account holder; and
(iii) authenticating the account holder in response to matching the inputted authentication data to the account holder record corresponding to the account holder;

processing the e-commerce transaction in response to completing the authentication process;

receiving at least one subsequent transaction request for at least one subsequent e-commerce transaction between the account holder and the merchant or at least one other merchant, the at least one subsequent transaction request comprising transaction details including a transaction value and a transaction time;

determining to bypass the authentication process for the at least one subsequent transaction based on the transaction value of the e-commerce transaction, the transaction time of the e-commerce transaction, the transaction value of the at least one subsequent e-commerce transaction, and the transaction time of the at least one subsequent e-commerce transaction; and in response to determining to bypass the authentication process, processing the at least one subsequent e-commerce transaction without requiring the authentication process to be completed again.

2. The method of claim 1, further comprising:

receiving at least one additional transaction request for at least one additional e-commerce transaction between the account holder and the merchant or at least one other merchant, the at least one additional transaction request received after the at least one subsequent transaction request, the at least one additional transaction request comprising transaction details including a transaction value and a transaction time;

determining to perform the authentication process for the at least one additional transaction based on the transaction value of the at least one additional e-commerce transaction, the transaction time of the at least one additional e-commerce transaction, the transaction value of the at least one subsequent e-commerce transaction, and the transaction time of the at least one subsequent e-commerce transaction;

performing the authentication process for the at least one additional transaction; and processing the at least one additional transaction in response to completing the authentication process.

3. The method of claim 1, wherein determining to bypass the authentication process for the at least one subsequent transaction comprises comparing a duration of a time window extending between the transaction time of the e-commerce transaction and the transaction time of the at least one subsequent e-commerce transaction to a total transaction value including the transaction value of the e-commerce transaction and the transaction value of the at least one subsequent e-commerce transaction.

4. The method of claim 1, wherein determining to bypass the authentication process for the at least one subsequent transaction is based on the account privilege information set by the account holder.

5. The method of claim 1, wherein the account privilege information comprises a designated authentication window for authenticating multiple transactions with a single authentication process.

6. The method of claim 1, wherein determining to bypass the authentication process for the at least one subsequent transaction comprises determining that a dollar amount was not used up by the transaction value of the e-commerce transaction.

7. The method of claim 1, wherein determining to bypass the authentication process for the at least one subsequent transaction is based on: (i) a time window extending between the transaction time of the e-commerce transaction and the transaction time of the at least one subsequent e-commerce transaction and (ii) a total transaction value including the transaction value of the e-commerce transaction and the transaction value of the at least one subsequent e-commerce transaction.

8. A system for facilitating session-based authentication for a plurality of e-commerce transactions for an account holder, comprising at least one processor configured to:

register a plurality of account holders, each account holder of the plurality of account holders corresponding to an account holder record containing account privilege information;

receive, from an account holder of the plurality of account holders, user input setting the account privilege information for an account corresponding to the account holder;

receive a transaction request for an e-commerce transaction between the account holder and a merchant, the transaction request comprising transaction details including a transaction value and a transaction time;

in response to the transaction request, perform an authentication process comprising:
 (i) prompting the account holder to input authentication data in response to the transaction request;
 (ii) comparing the inputted authentication data to the account holder record corresponding to the account holder; and
 (iii) authenticating the account holder in response to matching the inputted authentication data to the account holder record corresponding to the account holder;

process the e-commerce transaction in response to completing the authentication process;

receive at least one subsequent transaction request for at least one subsequent e-commerce transaction between the account holder and the merchant or at least one other merchant, the at least one subsequent transaction request comprising transaction details including a transaction value and a transaction time;

determine to bypass the authentication process for the at least one subsequent transaction based on the transaction value of the e-commerce transaction, the transaction time of the e-commerce transaction, the transaction value of the at least one subsequent e-commerce transaction, and the transaction time of the at least one subsequent e-commerce transaction; and in response to determining to bypass the authentication process, process the at least one subsequent e-commerce transaction without requiring the authentication process to be completed again.

9. The system of claim 8, wherein the at least one processor is further configured to:

receive at least one additional transaction request for at least one additional e-commerce transaction between the account holder and the merchant or at least one other merchant, the at least one additional transaction request received after the at least one subsequent transaction request, the at least one additional transaction request comprising transaction details including a transaction value and a transaction time;

determine to perform the authentication process for the at least one additional transaction based on the transaction value of the at least one additional e-commerce transaction, the transaction time of the at least one additional e-commerce transaction, the transaction value of the at least one subsequent e-commerce transaction, and the transaction time of the at least one subsequent e-commerce transaction;

perform the authentication process for the at least one additional transaction; and process the at least one additional transaction in response to completing the authentication process.

10. The system of claim 8, wherein determining to bypass the authentication process for the at least one subsequent transaction comprises comparing a duration of a time window extending between the transaction time of the e-commerce transaction and the transaction time of the at least one subsequent e-commerce transaction to a total transaction value including the transaction value of the e-commerce transaction and the transaction value of the at least one subsequent e-commerce transaction.

11. The system of claim 8, wherein determining to bypass the authentication process for the at least one subsequent transaction is based on the account privilege information set by the account holder.

12. The system of claim 8, wherein the account privilege information comprises a designated authentication window for authenticating multiple transactions with a single authentication process.

13. The system of claim 8, wherein determining to bypass the authentication process for the at least one subsequent transaction comprises determining that a dollar amount was not used up by the transaction value of the e-commerce transaction.

14. A method for facilitating session-based authentication for a plurality of e-commerce transactions for an account holder, comprising:
   registering, with at least one computer system, a plurality of account holders, each account holder of the plurality of account holders corresponding to an account holder record containing account privilege information;
   receiving, from an account holder of the plurality of account holders, user input setting the account privilege information for an account corresponding to the account holder;
   receiving a transaction request for an e-commerce transaction between the account holder and a merchant, the transaction request comprising transaction details including a transaction value and a transaction time;
   in response to the transaction request, performing, with at least one computer system, an authentication process comprising:
      (i) prompting the account holder to input authentication data in response to the transaction request;
      (ii) comparing the inputted authentication data to the account holder record corresponding to the account holder; and
      (iii) authenticating the account holder in response to matching the inputted authentication data to the account holder record corresponding to the account holder;
   processing the e-commerce transaction in response to completing the authentication process;
   receiving at least one subsequent transaction request for at least one subsequent e-commerce transaction between the account holder and the merchant or at least one other merchant, the at least one subsequent transaction request comprising transaction details including a transaction value and a transaction time;
   determining to bypass the authentication process for the at least one subsequent transaction based on account privilege information set by the account holder and at least one of the following parameters: the transaction value of the e-commerce transaction, the transaction time of the e-commerce transaction, the transaction value of the at least one subsequent e-commerce transaction, the transaction time of the at least one subsequent e-commerce transaction, or any combination thereof; and
   in response to determining to bypass the authentication process, processing the at least one subsequent e-commerce transaction without requiring the authentication process to be completed again.

15. The method of claim 14, further comprising:
   receiving at least one additional transaction request for at least one additional e-commerce transaction between the account holder and the merchant or at least one other merchant, the at least one additional transaction request received after the at least one subsequent transaction request, the at least one additional transaction request comprising transaction details including a transaction value and a transaction time;
   determining to perform the authentication process for the at least one additional transaction based on the transaction value of the at least one additional e-commerce transaction, the transaction time of the at least one additional e-commerce transaction, the transaction value of the at least one subsequent e-commerce transaction, and the transaction time of the at least one subsequent e-commerce transaction;
   performing the authentication process for the at least one additional transaction; and
   processing the at least one additional transaction in response to completing the authentication process.

16. The method of claim 14, wherein determining to bypass the authentication process for the at least one subsequent transaction comprises comparing a duration of a time window extending between the transaction time of the e-commerce transaction and the transaction time of the at least one subsequent e-commerce transaction to a total transaction value including the transaction value of the e-commerce transaction and the transaction value of the at least one subsequent e-commerce transaction.

17. The method of claim 14, wherein the account privilege information comprises a designated authentication window for authenticating multiple transactions with a single authentication process.

18. The method of claim 14, wherein determining to bypass the authentication process for the at least one subsequent transaction comprises determining that a dollar amount was not used up by the transaction value of the e-commerce transaction.

19. The method of claim 14, wherein determining to bypass the authentication process for the at least one subsequent transaction is based on: (i) a time window extending between the transaction time of the e-commerce transaction and the transaction time of the at least one subsequent e-commerce transaction and (ii) a total transaction value including the transaction value of the e-commerce transaction and the transaction value of the at least one subsequent e-commerce transaction.

* * * * *